June 18, 1929.  W. F. MacGREGOR  1,717,931
COMBINATION HARVESTER THRASHER
Filed Feb. 17, 1925
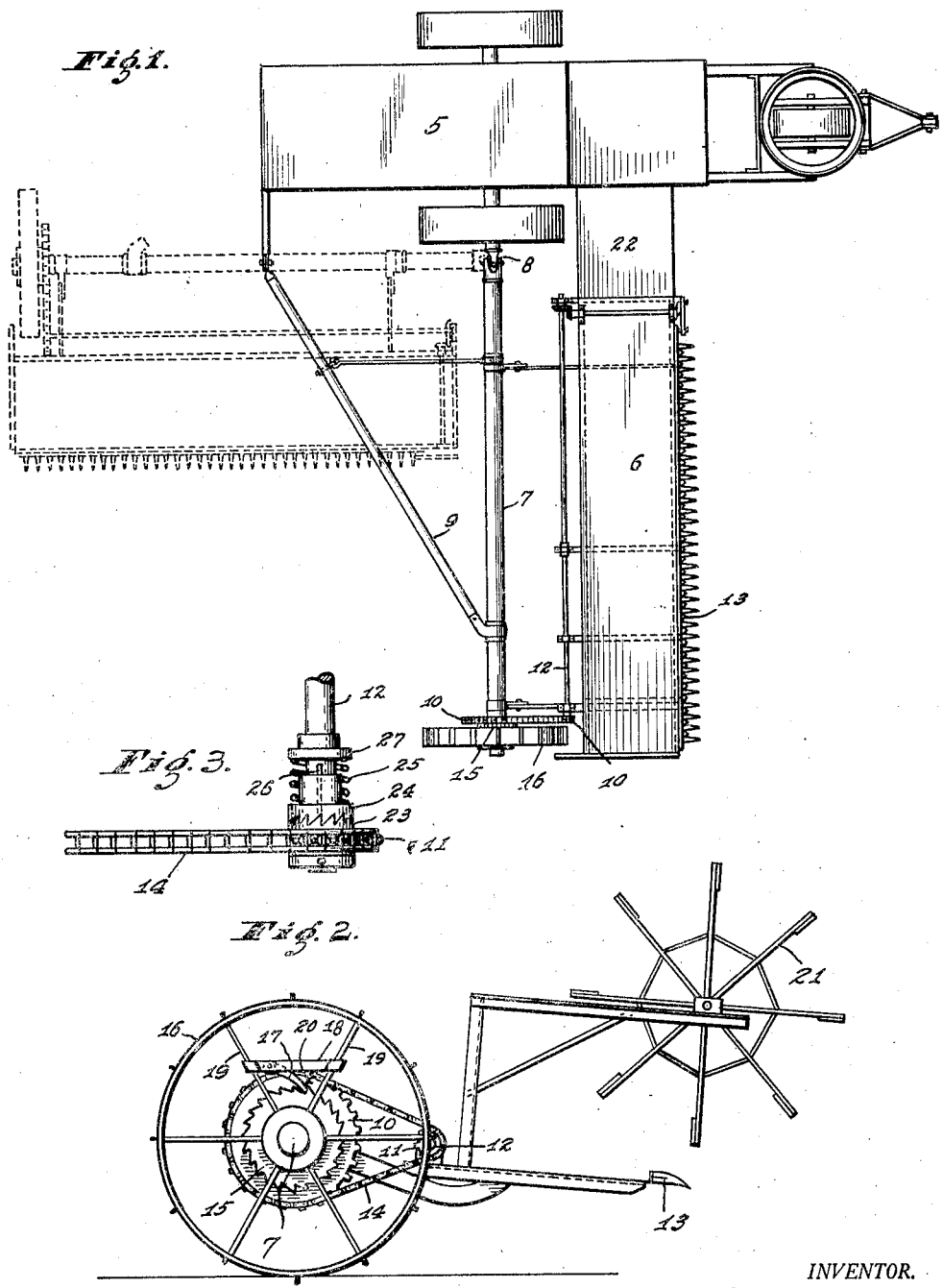
INVENTOR.
WALLACE F. MacGREGOR,
BY James A. Walsh,
ATTORNEY.

Patented June 18, 1929.

1,717,931

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed February 17, 1925. Serial No. 9,895.

My invention relates to improvements in combination harvester-thrashers, and particularly to traction means for actuating the harvester cutting mechanism as the machine is propelled through the field, which means is self-contained on the harvester and of a character that said harvester can be folded alongside the thrasher without disconnecting or disturbing any of the parts of said actuating mechanism.

In the accompanying drawing, forming part hereof, Figure 1 is a plan of a combination harvester-thrasher embodying my invention; Fig. 2 an end elevation of the harvester element of the machine showing my improvement applied thereto, and Fig. 3 a detail showing a modified form of harvester actuating mechanism which I may employ.

In said drawings the portions marked 5 indicate the thrasher, and 6 the harvester, mounted upon an axle 7 which may be common to both, and preferably of a sectional character connected by a suitable joint, as at 8, to permit variable movements of the harvester when moving across uneven ground surfaces, and also by which said harvester may be swung horizontally and folded alongside the thrasher to reduce the width of the machine as a whole for transportation and storage purposes, said axle and thrasher being connected by a removable brace-rod, 9, for purposes of stability when moving and operating the machine in the field during cutting and thrashing operations, the machine including other details of construction employed in such type and not necessary to describe.

Upon axle 7 I mount a sprocket, 10, and, in alinement therewith, a sprocket, 11, is mounted on the harvester shaft, 12, which actuates the sickle, 13, in a well known manner. Said sprockets 10 and 11 are connected by a chain, 14, the sprocket 10 having a ratchet, 15, connected thereto, and which ratchet and sprocket are loosely mounted on axle 7, said ratchet being controlled against rearward rotation by a pawl, 17, supported upon a brace, 18, connected to spokes, 19, of ground wheel, 16, and said pawl, as indicated, is held in engagement with the teeth of ratchet 15 by a spring, 20, of any desired character. While I have shown and described such mechanism for actuating the harvester solely by the traction of its ground-wheel 16 it will be apparent that other means may be employed, as, for example, those shown in Fig. 3, in which a clutch sprocket comprising the members 23, 24, is mounted on harvester shaft 12, and said sprocket connected by chain 14 to sprocket 10, the arrangement being yieldingly adjusted by means of spring 25, spline 26 and stop 27, in a well known manner, in other words, I provide a unitary power plant in connection with the harvester for actuating the cutting and conveying instrumentalities thereof, which plant is operated by the traction wheel 16, and which is entirely independent of any driving connection with the thrasher element of the machine.

In operation, it will be understood, that the machine is drawn through the field by mechanical or horse power, and the rotation of ground-wheel 16 causes the sprocket and chain system disclosed to actuate harvester shaft, 12, which in turn actuates the sickle 13, reel, 21, and endless carriers, 22. Should the direction of movement of the machine be reversed the engagement of pawl 17 with the ratchet 15 will prevent operation of the sprocket driving mechanism and consequently that of said sickle 13, reel, and carriers, as will be apparent, while the modified arrangement shown in Fig. 3 will act in similar manner. When it is desired to position the harvester alongside the thrasher, as indicated by dotted lines in Fig. 1, the brace 9 is removed, when the harvester may be readily swung horizontaly into parallel relation with the thrasher, and likewise remains in normal operative condition when said harvester is returned to cutting position as indicated by full lines in Fig. 1. I am thus enabled to provide an extremely simple and efficient power unit in connection with the outer end of the harvester without dependence upon the drawing or operating power of the thrasher, and which at all times remains in operable condition.

I claim as my invention:

1. In a machine of the class described, a thrasher, an axle, means connecting said axle to said thrasher to permit the vertical oscillation of said axle, a harvester mounted upon said axle, a wheel supporting the outer end of said axle, a sprocket-and-chain system adjacent said wheel and connecting said axle and harvester, and means on said wheel engaging said sprocket-and-chain system for actuating the same to operate the cutting and conveying mechanisms of said harvester upon the rotation of said wheel.

2. In a machine of the class described, a thrasher, a harvester, an axle oscillatably and rockingly connected to the thrasher and supporting the harvester, a wheel for supporting the outer end of said harvester, driving mechanism mounted upon said axle and said harvester, and means on said wheel engaging said driving mechanism for actuating the same to operate mechanisms on said harvester upon the rotation of said wheel.

3. In a machine of the class described, a thrasher, a harvester, an axle oscillatably connected to the thrasher and supporting said harvester, a wheel mounted upon the outer end of said axle, a shaft carried by said harvester, cutting means on said harvester and connected to said shaft, a sprocket on said axle, a ratchet associated therewith said sprocket and ratchet being adjacent said wheel, a sprocket on said harvester shaft, a chain connecting said sprockets, and means on said wheel engaging said ratchet whereby said cutting means are operated upon the rotation of said wheel.

4. In a machine of the class described, a thrasher, supporting means oscillatably connected thereto, a harvester embodying cutting mechanism mounted upon said supporting means, a wheel for sustaining the outer end of said supporting means, driving mechanism mounted upon said supporting means and said harvester adjacent said wheel, and means on said wheel engaging said driving mechanism for actuating the latter to operate the harvester cutting mechanism upon the rotation of said wheel.

5. In a machine of the class described, a thrasher, a harvester, an axle oscillatably and foldingly connected to the thrasher and supporting the harvester whereby the harvester may oscillate in its movements over ground irregularities during cutting operations and be folded alongside the thrasher when in traveling relation thereto, and power transmitting mechanism upon said supporting means, comprising a traction wheel and means engaging therewith and connected to said harvester for actuating the latter upon the rotation of said wheel.

6. In a machine of the class described, a thrasher, a harvester, an axle flexibly connected to said thrasher, means for connecting said harvester to said axle, and a self-contained power plant associated with said harvester comprising a traction wheel on said axle, power transmitting mechanism on said axle and engaging said wheel, and means on said harvester connected to said mechanism, whereby upon the rotation of said wheel said mechanism actuates said harvester.

7. In a machine of the class described, a thrasher embodying power actuated mechanisms for thrashing and separating grain, an axle connected to the thrasher to oscillate in relation thereto, a harvester supported by the axle in offset relation to the axle said harvester embodying grain gathering mechanism, a wheel on the outer end of the axle, driving mechanism mounted on the axle and the harvester, and means on the wheel engaging said driving mechanism for actuating the latter to operate said gathering mechanism upon the rotation of the wheel and independently of the power of the actuating mechanisms in said thrasher.

In testimony whereof I affix my signature.

WALLACE F. MacGREGOR.